(12) United States Patent
Gallegos-Lopez (10) Patent No.: US 6,661,206 B2
(45) Date of Patent: Dec. 9, 2003

(54) SOFT CHOPPING FOR SWITCHED RELUCTANCE GENERATORS

(75) Inventor: Gabriel Gallegos-Lopez, Alexandria, IN (US)

(73) Assignee: Delphi Technologies, Inc., Troy, MI (US)

( * ) Notice: Subject to any disclaimer, the term of this patent is extended or adjusted under 35 U.S.C. 154(b) by 40 days.

(21) Appl. No.: 10/013,223

(22) Filed: Dec. 10, 2001

(65) Prior Publication Data

US 2003/0107342 A1 Jun. 12, 2003

(51) Int. Cl.⁷ .................................................. H02P 5/16
(52) U.S. Cl. .............................. 322/23; 322/10; 322/44; 322/29; 322/94
(58) Field of Search ............................ 322/23, 10, 44, 322/20, 94, 29

(56) References Cited

U.S. PATENT DOCUMENTS

| 5,012,177 A | * | 4/1991 | Dhyanchand et al. ......... 322/10 |
| 5,204,604 A | | 4/1993 | Radun |
| 5,289,107 A | * | 2/1994 | Radun et al. .................. 322/94 |
| 5,327,069 A | * | 7/1994 | Radun et al. .................. 322/10 |
| 5,381,081 A | * | 1/1995 | Radun .......................... 322/94 |
| 5,404,091 A | | 4/1995 | Radun |
| 5,493,200 A | * | 2/1996 | Rozman et al. ............... 322/10 |
| 5,705,918 A | * | 1/1998 | Davis ........................... 322/94 |
| 5,780,997 A | * | 7/1998 | Sutrina et al. ................ 322/29 |
| 5,850,133 A | | 12/1998 | Heglund |
| 5,905,366 A | * | 5/1999 | Wilson ......................... 322/44 |
| 5,936,386 A | | 8/1999 | Heglund |

* cited by examiner

*Primary Examiner*—Thanh Lam
(74) *Attorney, Agent, or Firm*—Margaret A. Dobrowitsky (57) ABSTRACT

The switched reluctance machine providing soft chopping in the output current controls the voltage across the phase winding. When the current through the phase winding in the generating mode reaches a first predetermined value, the voltage across the phase winding is reversed and as a result, the current through the phase winding decreases. When the phase winding current reaches a second value, the phase winding is shorted so that the current increases due to the positive back-EMF through the phase winding until the first predetermined value is again reached, at which time the voltage across the phase winding is again reversed.

32 Claims, 7 Drawing Sheets

SOFT CHOPPING FOR SWITCHED RELUCTANCE GENERATORS

This invention was made with the United States government support under DARPA contract number MDA-972-94-2-0004. The United States government has certain rights in this invention.

BACKGROUND OF THE INVENTION

This invention relates to switched reluctance machines, and more particularly to a switched reluctance machine utilizing soft chopping to regulate the current, especially when the switched reluctance generator operates at low speed.

The continued advances in high-power switching semiconductors and control electronics have enabled the use of switched reluctance generators, which have been used extensively in motor applications in the past, to be increasingly exploited for the generation of electrical energy. The use of switched reluctance generators in such applications is highly desirable as the generators are simple and rugged due in part to the winding-free, magnet-free brushless construction of the salient pole rotor. This construction permits the use of the switched reluctance machine at high speeds and under harsh environmental conditions. Also, since the rotor lacks windings and magnets, it generally costs less than a wound or permanent magnet rotor.

Figure 1:
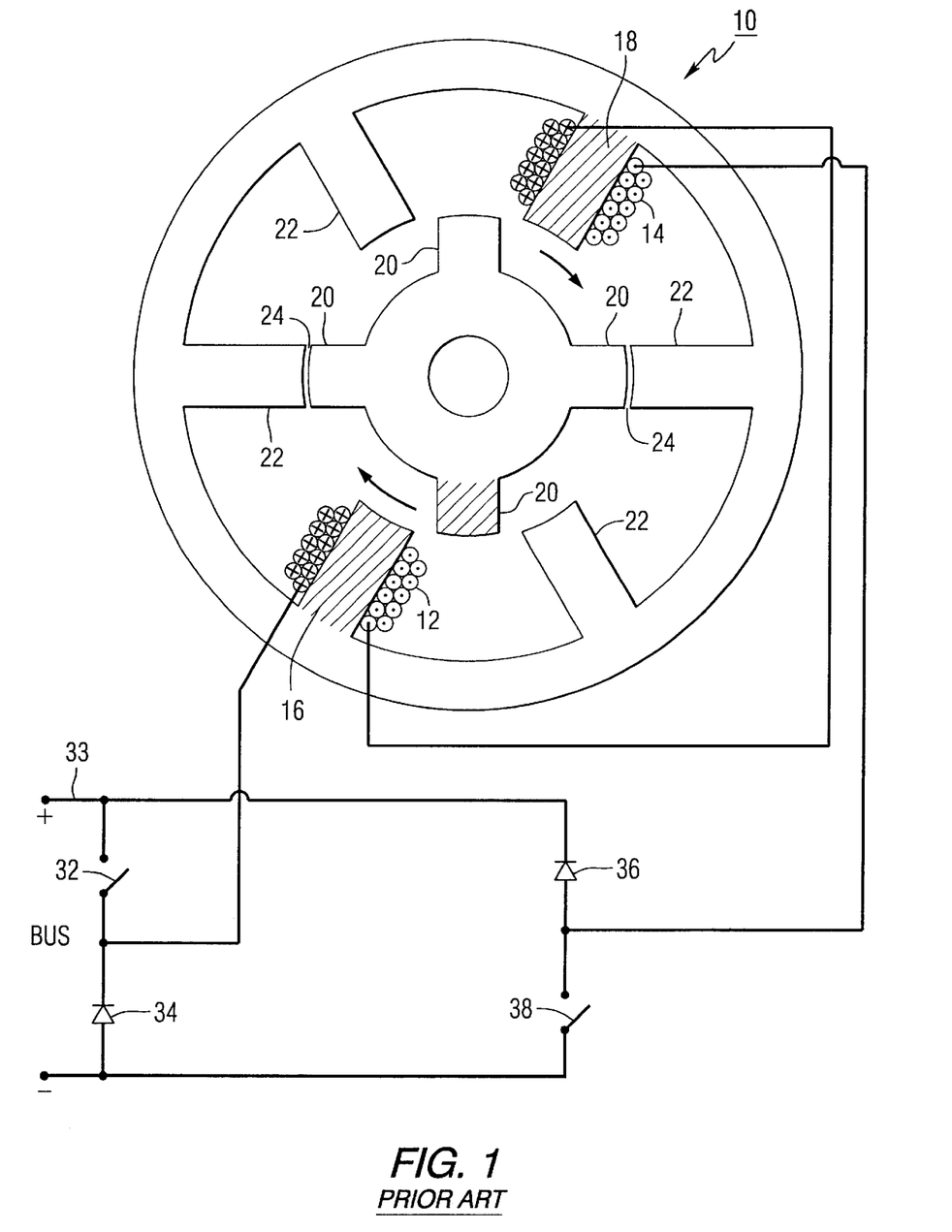
FIG. 1 illustrates certain components of a switched reluctance machine.

A diagram of a switched reluctance machine, together with one phase winding and the associated power converter components, is shown in FIG. 1. Each phase winding of the switched reluctance machine 10 comprises two serially-connected coils (for example, coils 12 and 14) wound around diametrically opposed stator poles (for example poles 16 and 18). Torque is produced in the switched reluctance machine 10 by the tendency of the nearest rotor pole pair to move to a minimum reluctance position with respect to the excited stator pole pair. The magnitude and direction of the produced torque is determined by the magnitude of the exciting phase current pulses and the placement of these pulses with respect to rotor position. Ideally, the torque generated by an unsaturated switched reluctance machine is $$T_e(I,\theta) = \tfrac{1}{2} I^2 (dL(\theta)/d\theta),$$

where I is the phase current, L is the phase inductance and θ is the rotor angle. Note that the torque direction is independent of the sign of the current so the phase current can be unidirectional. Also, the sign of the torque is determined by the placement of the phase current pulse relative to the change of phase inductance, $dL(\theta)/d\theta$.

FIG. 2 illustrates an idealized example of the placement of the current pulses for torque and electrical power generation in the switched reluctance machine 10. Specifically, FIG. 2 illustrates the idealized phase inductance variation as a function of rotor angle (θ), the motoring current and the generating current, both also as a function of the rotor angle θ.

Figure 2A:
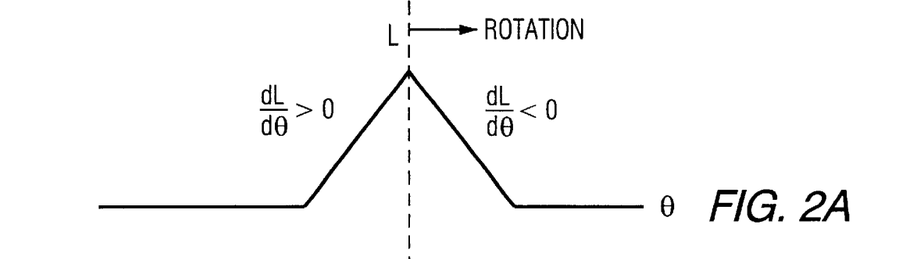
FIG. 2 is a time line illustrating certain position-based parameters associated with a switched reluctance machine.
Figure 2B:
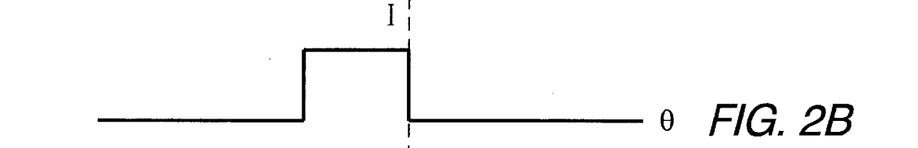

Returning to FIG. 1, each of the rotor poles is identified by a reference character 20. The six stator pole pairs are identified by reference characters 16, 18 and 22. When the stator pole 18 is not aligned with any of the rotor poles 20, the inductance there between is at its minimum value, as shown by the horizontal segment of the FIG. 2A inductance curve. As the rotor angle changes, the stator pole 18 begins to overlap the rotor pole 20, and the inductance rises and reaches a maximum value when the stator pole 18 is aligned with the rotor pole 20. Maximum inductance is illustrated in FIG. 2A by the vertical line bearing reference character 30. For motoring operation, the current is supplied to the diametrically opposed stator poles 16 and 18 via the windings 12 and 14, respectively, during the period when the inductance is increasing and the rotor poles 20 are approaching the stator poles 16 and 18. The motoring current is shown in FIG. 2B. Since the inductance is increasing in this region, the torque produced acts in the direction of rotor rotation, thus producing positive torque.

Figure 2C:
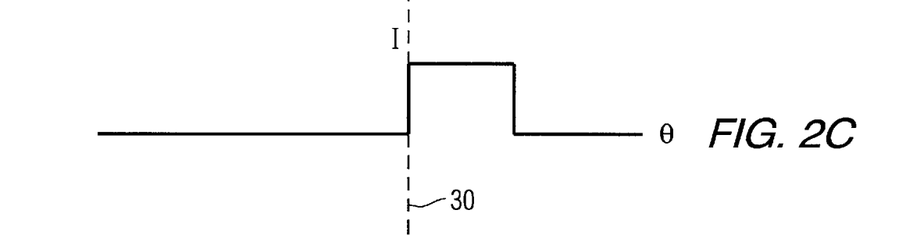

To generate electrical power, current must be supplied during the period when the inductance is decreasing as the rotor poles 20 pull away from the stator poles 16 and 18. See FIG. 2C. Since the phase inductance is decreasing in this region, the torque opposes rotor motion. The work done by the system to pull the stator and rotor poles apart is returned as energy to the DC bus, which also supplies the motoring and the generating current. Ideally, in the generating mode, the phase current should be provided in the region where the phase inductance is decreasing, as shown in FIG. 2C. However, given the back-EMF experienced by the switched reluctance machine 10, the phase current should be provided several degrees before the maximum phase inductance position is reached. This assures that sufficient current is available in the phase windings 12 and 14, for example, when the rotor poles 20 enter the region where the phase inductance begins to decrease.

Thus, the switched reluctance machine operates both as a motor and as a generator. The inductance of each phase winding (for example, the coils 12 and 14 of FIG. 1 comprise one phase winding) varies according to the degree of overlap between the stator poles 16 and 18 and the rotor poles 20 as the latter rotate. If current is supplied while the winding inductance is increasing (i.e., the degree of overlap is increasing) then the magnetic force on the rotor poles 20 tends to increase the degree of overlap by creating a positive torque. This physical phenomena is the basis for the motoring operation of the switched reluctance machine 10.

If current is applied to the coils 16 and 18 while the winding inductance is decreasing (i.e., the degree of overlap between the stator poles 16 and 18 and the rotor poles 20 is decreasing) then the resulting magnetic force opposes further separation of the rotor poles 20 and the stator poles 16 and 18. This separation acting against the magnetic force demands an input of mechanical energy to the rotor, which is in turn converted by the switched reluctance machine 10 into electrical energy in the form of an increasing winding current. This current reaches its maximum value when the inductance is high and as a result the opposing magnetic force (and therefore the generated current) is large during separation between the stator poles 16 and 18 and the rotor poles 20.

The switched reluctance machine 10 illustrated in FIG. 1 includes the stator poles 16 and 18 plus four additional stator poles 22. The FIG. 1 embodiment also includes four rotor poles 20, and is thus referred to as having a 6/4 topology (six stator poles and four rotor poles). As is recognized by one skilled in the art, a different topology can be utilized with corresponding changes in the controlling mechanism associated with the present invention (to be described herein below) without departing from the scope of the invention.

To allow rotation of the rotor poles 20, a small air gap 24 exists between the outer periphery of the rotor poles 20 and the inner periphery of the stator poles 16, 18 and 22. In one embodiment, this air gap is approximately 0.25 mm, but may vary due to machining and manufacturing tolerances or by design depending on the desired characteristics of the switched reluctance machine 10. Since a switched reluctance machine operates in accordance with the changing inductance between the rotor and stator poles, a slight change in the air gap has a significant impact on performance characteristics.

A simplified schematic of the control components associated with the phase windings 12 and 14 for providing commutation to the switched reluctance machine 10 is also illustrated in FIG. 1. A series connection of switch 32 and a diode 34 is connected across the DC bus 33, with the anode terminal of the diode 34 connected to the negative voltage of the DC bus 33. A series connection of a diode 36 and a switch 38 is also connected across the DC bus 33, with the cathode terminal of the diode 36 connected to the positive voltage. Note that the windings 12 and 14 are serially connected between the junction of the switch 32 and the cathode terminal of the diode 34 and the junction of the switch 38 and the anode terminal of the diode 36.

Figure 3A:
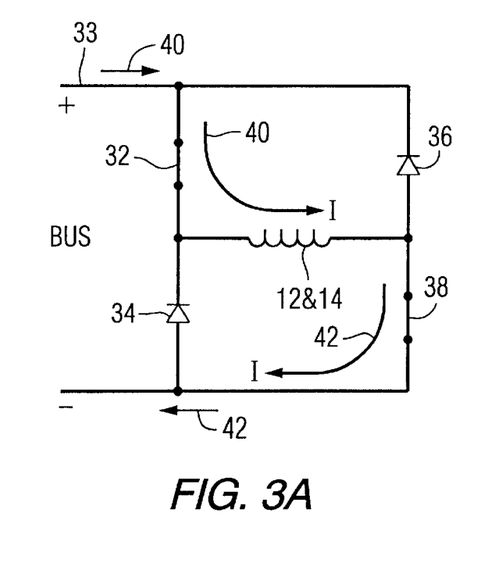
FIGS. 3A and 3B illustrate a prior art control technique for the switched reluctance machine.
Figure 3B:
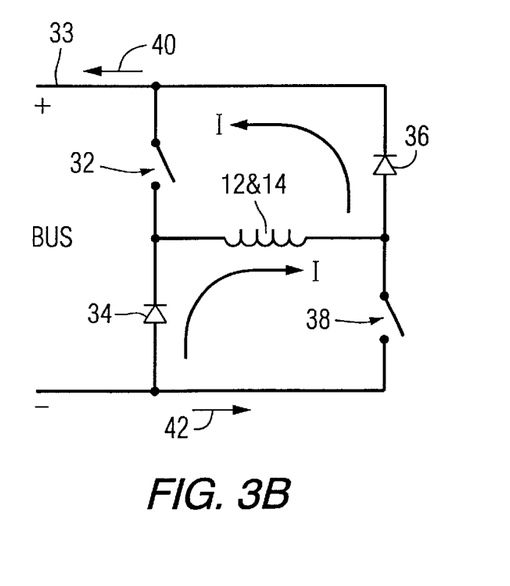
Figure 4A:
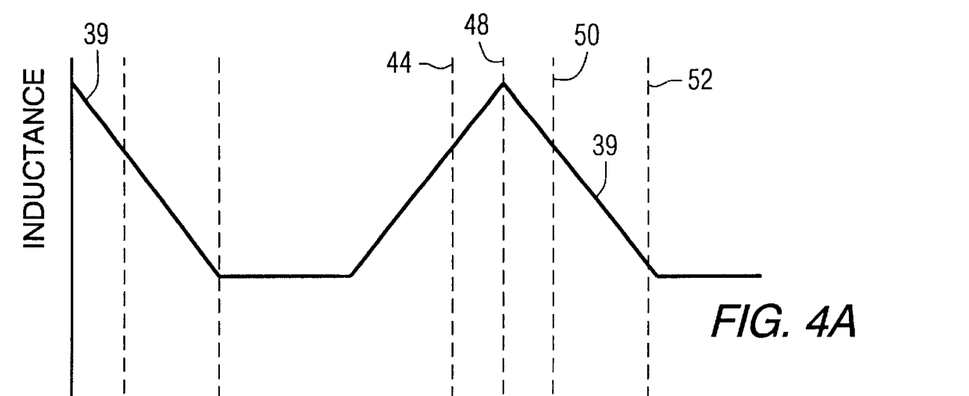
FIGS. 4A and 4B are time lines illustrating certain time-based parameters associated with a switched reluctance machine.
Figure 4B:
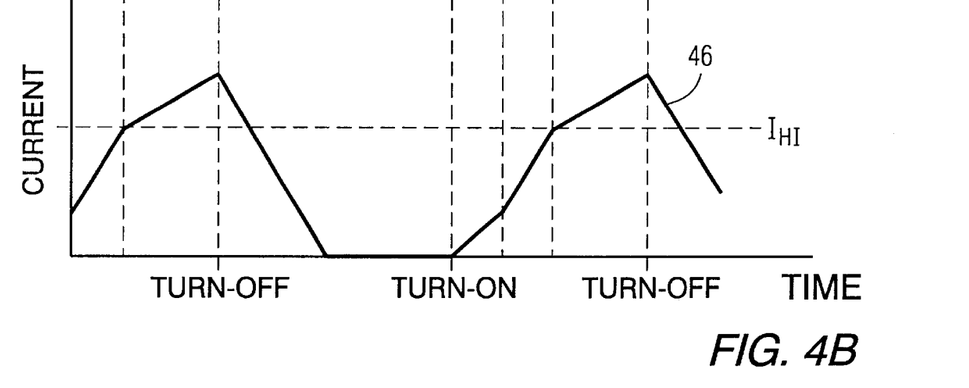

A schematic representation of the switches 32 and 38, the diodes 34 and 36 and the phase windings 12 and 14 is also illustrated in FIGS. 3A and 3B. The commutation approach described in conjunction with FIGS. 3A and 3B is illustrated in FIGS. 4A and 4B, which is somewhat more complex than the commutation approach illustrated in FIG. 2. FIG. 4B illustrates an example of single pulse operation where the current fed back to the bus 33 is not regulated. As the rotor rotates, the inductance of the stator windings (for instance the stator windings 12 and 14) varies as the salient rotor poles 20 come into and out of alignment with the stator poles 16, 18 and 22. The inductance variation is illustrated by a trace 39 of FIG. 4A. As the rotor poles 20 move toward alignment with the stator poles 16 and 18, the switches 32 and 38 close so that current flowing from the DC bus 33 energizes the stator windings 12 and 14. The arrows 40 and 42 indicate the current direction. This current is supplied beginning at a turn-on angle, as the rotor poles approach alignment with the stator poles, as indicated by the vertical line 44 in FIG. 4A, which identifies the current turn-on time.

Once both the switches 32 and 38 are closed, the current through the stator coils 12 and 14 increases, as indicated by the trace 46 of FIG. 4B, and the rotor poles 20 are attracted to the stator poles 16 and 18. At the vertical line 48, the rotor and the stator poles are aligned and the inductance therefore peaks. Beyond this point, as the rotor poles 20 continue to rotate, the inductance decreases, causing the back-EMF in the coils 12 and 14 to become positive. Note that the back-EMF is negative up to the point where the inductance begins to decrease. Since the back-EMF is now positive, it is added to the DC bus voltage and thus the current increases at a faster rate. As the inductance decreases, the current increases rapidly and the back-EMF also increases, until eventually the back-EMF exceeds the DC bus voltage. Once the current exceeds the upper current limit ($I_{HI}$) at the vertical line 50 of the trace 46, both the switches 32 and 38 open, as shown in FIG. 3B. Now current is returned to the DC bus 33 through the diodes 34 and 36.

Due to the decreasing inductance during this segment of the cycle, the current delivered to the bus continues to increase. However, once the rotor and stator poles are not overlapped, beginning at the vertical line 52, the inductance reaches its minimum value, where it remains until the rotor and stator poles begin to approach alignment again during the next electrical cycle. During this segment, the current delivered to the bus 33 decays to zero. Because more current is generated during the decrease in inductance (as the rotor pole pulls away from the stator pole) than is required to be supplied by the DC bus 33, a net generation of electrical power occurs. The switches 32 and 38 can be implemented with insulated-gate bipolar transistors, metal-oxide-semiconductor-controlled thyristors and static induction transistors, as well as other power switching devices known in the art.

SUMMARY OF THE INVENTION

The prior art switched reluctance machine uses hard chopping to regulate the current during the generating mode. Hard chopping refers to the use of only the positive voltage and the negative voltage to regulate the current in a winding of a switched reluctance machine. The positive voltage is applied when both the switch connected to the positive bus and the switch connected to the negative bus are turned on or closed to energize the winding. See FIG. 3A. The negative voltage is applied when both the positive and negative bus connected switches are turned off or opened to de-energize the winding. As a result, the induction current free wheels through the diode connected to the positive bus voltage and the diode connected to the negative bus voltage. However, the efficiency of this technique is poor and there is considerable ripple in the phase current, because the current waveform has a significantly higher switching frequency then the soft chopping approach of the present invention.

In accordance with the teachings of the present invention, a soft chopping technique during the current generation phase reduces the current ripple. It is known that a ripple in the output current produces torque ripple in the switched reluctance machine, which in turn generates noise. Thus, a switched reluctance machine constructed according to the teachings of the present invention reduces this noise as well as increases the efficiency of the power conversion process by virtue of the decreased ripple in the output current. In addition, less power is wasted by recirculation of energy through the power converter, and the switched reluctance machine. Less ripple in the output current also results in an increase in the generated power and a reduction in the current filtering requirements. The soft chopping technique of the present invention applies a zero voltage, a positive voltage and a negative voltage to the phase winding to regulate the current in the winding. The positive and negative voltages are applied in a manner similar to the application in the hard chopping process. The zero voltage is applied to the phase winding by essentially disconnecting the phase winding from the positive and negative bus voltages and allowing the current to freewheel through a diode, a switch and the phase winding.

The soft chopping technique of the present invention is implemented through hysteresis current control during the period when the inductance of the switched reluctance machine phase winding is decreasing. Although the process of the present invention is especially advantageous during low speed operation of the switched reluctance machine, the teachings of the present invention can be employed at any operating speed.

BRIEF DESCRIPTION OF THE DRAWINGS

The present invention can be more easily understood and the further advantageous and uses thereof more readily apparent, when considered in view of the description of the preferred embodiments below and the following figures in which.

DETAILED DESCRIPTION OF THE PREFERRED EMBODIMENTS

Before describing in detail a particular switched reluctance machine constructed in accordance with the teachings of the present invention, it should be observed that the present invention resides primarily in a novel combination of processing steps and hardware elements related to a switched reluctance machine. Accordingly, these processing steps and hardware components have been represented by conventional processes and elements in the drawings, showing only those specific details that are pertinent to the present invention so as not to obscure the disclosure with details that will be readily apparent to those skilled in the art having the benefit of the teachings described herein.

Figure 5:
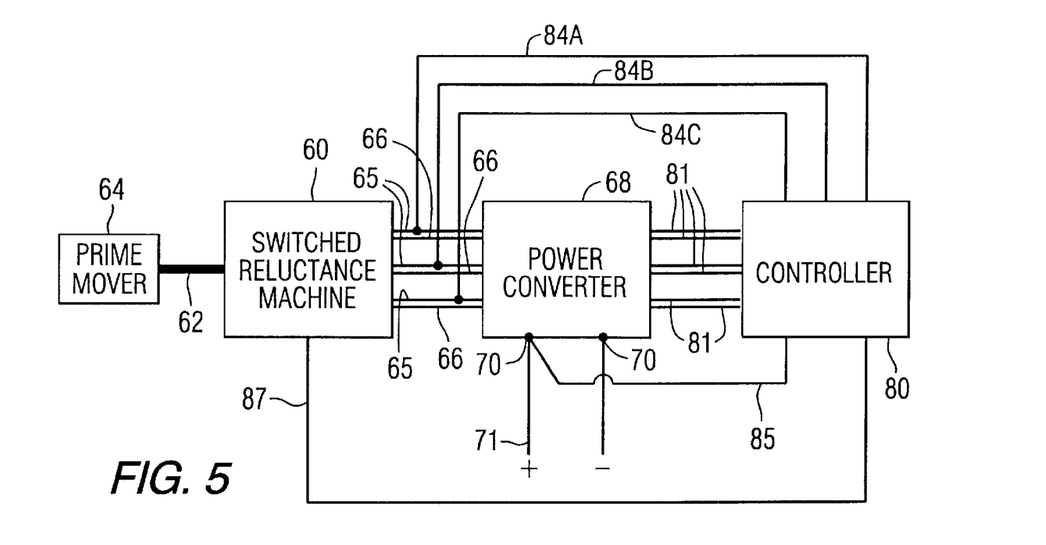
FIG. 5 is a block diagram illustrating a system incorporating a switched reluctance machine.

An embodiment of an electric power generating system suitable for implementation of a switched reluctance machine constructed according to the teachings of the present invention is illustrated in FIG. 5. FIG. 5 comprises a switched reluctance machine 60 having a rotor (not shown) drivingly coupled by a shaft 62 to a prime mover 64. The shaft 62 may provide direct coupling between the prime mover 64 and the switched reluctance machine 60 or may provide coupling through appropriate gearing or differentials as desired. Additionally, the shaft 62 may be integral to the prime mover 64 and the switched reluctance machine 60 provided integrally therein. The switched reluctance machine 60 is electrically coupled by three pairs of winding leads 65 and 66 (one pair for each phase of the switched reluctance machine 60) to a power converter 68, which is in turn electrically coupled at DC input/output terminals 70 to a DC distribution bus or DC link 71. Control of the switched reluctance machine 60 is effectuated by a controller 80 operating in conjunction with the power converter 68. As will be discussed further herein below, the power converter 68 comprise switches for controlling the switched reluctance machine 60 to effectuate the teachings of the present invention. There are two such switches for each phase winding of the switched reluctance machine 60. Therefore, FIG. 5 shows six control lines 81 from the controller 80 to the power converter 68; one control line 81 for each switch. Certain feedback signals (to be discussed further below) from the three pairs of the phased winding leads 65 and 66 carried on the feedback lines 84A, B and C, to the controller 80 represent the phase winding currents. The voltage at the positive terminal of the DC link 70 is input to the controller 80 via a feedback line 85. When operating in the generating mode, the controller 80 controls the DC link voltage and thus it is necessary for the DC link voltage signal to be fed back to the controller 80 via the feedback line 85. A feedback line 87 from the switched reluctance machine 60 to the controller 80 carries a signal representing the rotor position and is used by the controller 80 to generate the commutation signal, which will be discussed further hereinbelow in conjunction with FIG. 6.

Figure 6:
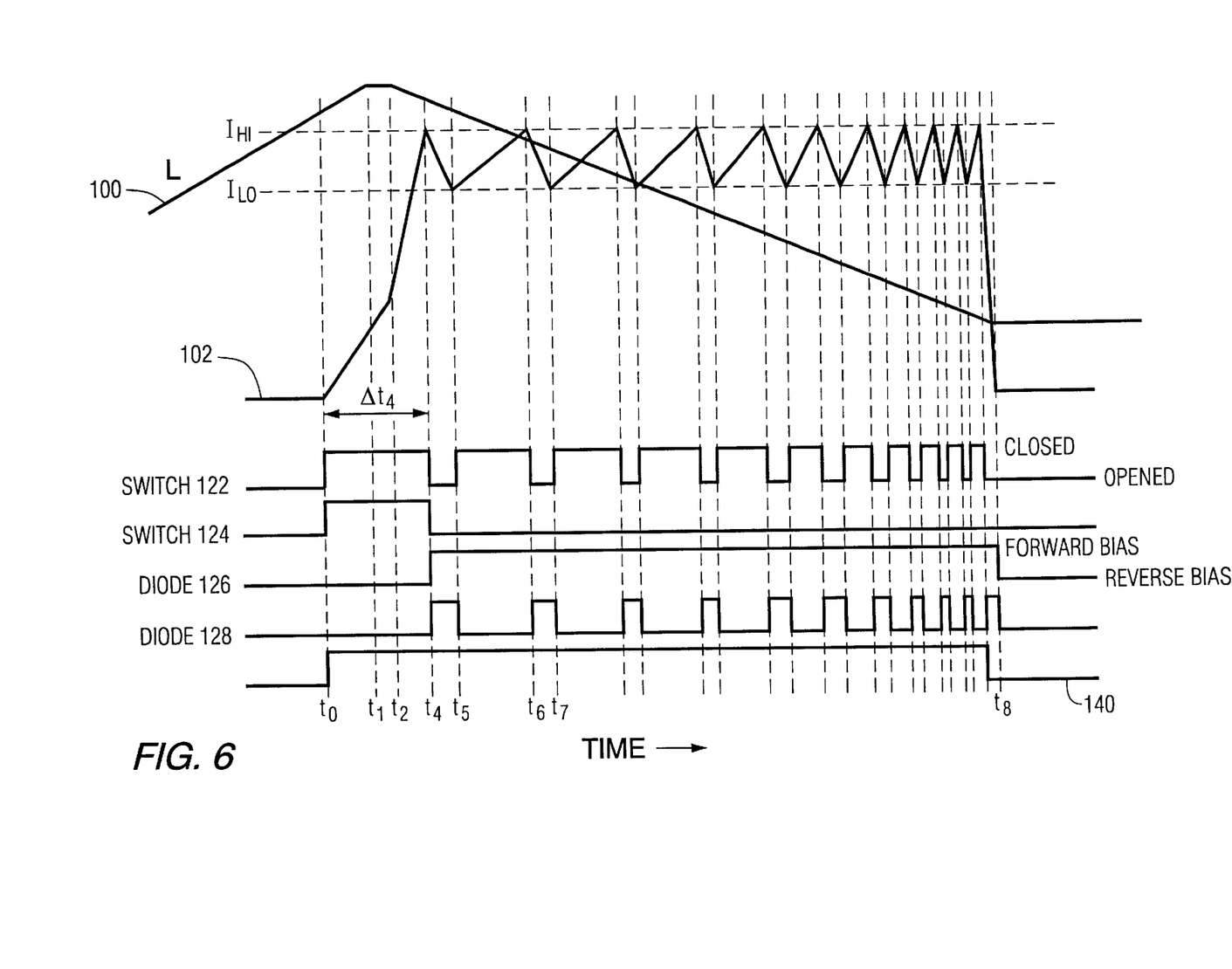
FIG. 6 is a timing diagram for a switched reluctance machine control process in accordance with the teachings of the present invention.

FIG. 6 shows several time-based traces of the inductance and current as well as the state of the switches and diodes comprising the power converter 68. The inductance is identified by a trace 100. Note that the inductance increases until a time $t_1$, at which point the stator poles (stator poles 16 and 18 as shown in FIG. 1, for example) are aligned with the rotor poles 20. The stator and rotor poles remain in alignment for a short, but discrete time interval, dependent upon the stator and rotor pole width. This alignment interval is identified in FIG. 6 by the period between $t_1$ and $t_2$. After $t_8$ the stator and rotor poles are unaligned and the inductance drops to its minimum value.

A trace 102 illustrates the current associated with the switched reluctance machine 60. In particular, during an interval $\Delta t_4$ input current excites the switched reluctance machine 60. Note that the current increases at a first rate during the interval $t_0$ to $t_2$ and increases at a second rate during the interval $t_2$ to $t_4$. This is due to the fact that at $t_2$ the rotor and stator poles begin to move out of alignment, the back-EMF turns positive and it adds to the DC-link voltage. As shown, from $t_4$ forward, the current resembles a sawtooth pattern (so called soft chopping) as will be explained herein below.

Figure 7A:
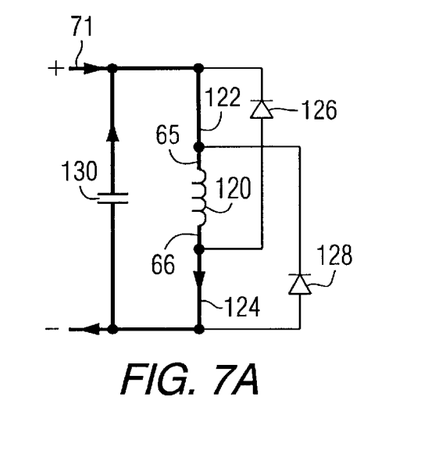
FIGS. 7A, 7B and 7C are schematic representations of the control components for effectuating control over the switched reluctance machine in accordance with the teachings of the present invention.
Figure 7B:
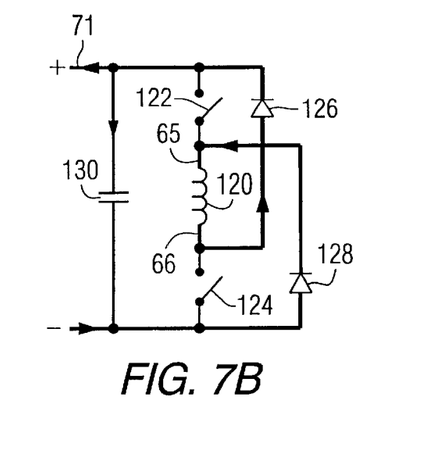
Figure 7C:
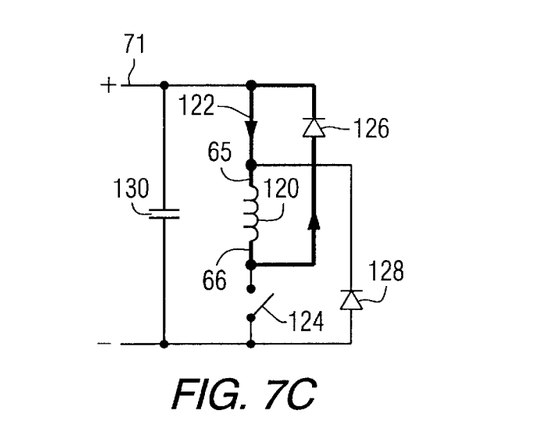

FIGS. 7A, 7B and 7C illustrate the circuit elements for controlling the switched reluctance machine 60 to produce the current 102 illustrated in FIG. 6. Current flow is indicated by the heavy lines and arrowheads in FIGS. 7A, 7B and 7C. FIGS. 7A, 7B and 7C illustrate a single phase winding of the switched reluctance machine 60, but those skilled in the art recognize that similar components are utilized to control the remaining phase windings and all of the phase winding currents are combined to form the total current of the switched reluctance machine 60. A capacitor 130 is placed across the DC bus 66 for filtering high-frequency ripple components in the bus current. In the FIG. 7A orientation, a switch 122 and a switch 124, connected in series with the phase winding 120, are shown in a closed position. The switches 122 and 124 are controlled by operative signals from the controller 80 of FIG. 5. This configuration corresponds to the interval $\Delta t_4$ (both the switches 122 and 124 are closed) illustrated in FIG. 6, during which time current is drawn from a DC bus 66, and therefore full positive DC bus voltage is supplied to the phase winding 120. The FIG. 6 traces for the switch positions are shown in a high or closed position during this interval. Returning to FIG. 7A, note that neither of the diodes 126 and 128 is forward biased and therefore no current flows through the diodes 126 and 128 during $\Delta t_4$. This is also indicated in the FIG. 6 time lines where the signal for both the diodes 126 and 128 is shown in a low or reverse-biased condition. While the configuration of FIG. 7A is operative, the back EMF in the phase winding 120 is negative as the inductance increases, but turns positive at $t_2$ as the inductance decreases. The power or current flows from the DC bus 66 through the phase winding 120 during the $\Delta t_4$ interval. The rate of current increase increases at $t_2$ because at this point the back-EMF is positive and therefore adds to the DC-link voltage. The total voltage across the phase winding 120 is therefore the sum of the back-EMF voltage and the DC-link voltage.

Note that FIGS. 6 and 7A, 7B and 7C refer to only one winding, and its associated components, of the switched reluctance machine 60. Similar components control the other two switched reluctance machine phases.

At $t_4$, both the switches 122 and 124 open, corresponding to the configuration illustrated in FIG. 7B. Note that the switches 122 and 124 (which are elements of the power converter 68) open, under control of the controller 80, when the current reaches or exceeds the threshold $I_{HI}$. With both the switches 122 and 124 open, current flows through the forward biased diodes 126 and 128 so that full negative bus voltage is applied to the phase winding 120 (the opposite of the configuration in FIG. 7A) and therefore the current flows into the DC bus 66 during the FIG. 7B configuration.

During this interval, the phase current decreases because the total phase winding voltage is negative. This occurs when the sum of the back-EMF in the phase winding (a positive value) and the DC bus voltage (a negative value), is negative. This situation occurs when the switched reluctance machine 10 is operating at a low or medium speed that is below the base speed. The base speed is defined as that speed at which the back-EMF equals the DC bus voltage. According to the torque/speed characteristics of any electric machine (including a switched reluctance machine), the torque is constant up to the base speed. Above the base speed the torque decreases at a rate approximately inversely proportional to the machine's speed. It is this low to medium speed range where the use of the present invention is particularly advantageous.

When the switched reluctance machine 10 operates above the base speed, the difference between the back-EMF and DC bus voltage is positive. That is, the back-EMF is larger than the DC bus voltage. In this condition, the switched reluctance machine 10 enters single pulse operation and no soft chopping in accordance with the present invention may be required. The current therefore continues to increase as the inductance decreases, because the back-EMF (a positive value) is greater than the DC bus voltage (a negative value) such that the sum is positive. The current can no longer be controlled because the phase winding voltage is positive. As a result, the current increases and decreases as a function of only the phase winding inductance.

In accordance with the present invention, note that from the current trace 102 of FIG. 6 it can be seen that the current decreases between $t_4$ and $t_5$ as the difference between the back-EMF and the DC bus voltage is negative when both switches 122 and 124 are open (the FIG. 7B configuration).

When the declining current reaches a value identified as $I_{LO}$ in FIG. 6 (at $t_5$) the switch 122 is closed, while the switch 124 remains open. See FIG. 7C. In this configuration no current is taken from nor supplied to the DC bus 66. Instead, the current free wheels through the switch 122 and the diode 126. However, the current in the short circuit loop increases due to the positive back-EMF created as the stator and rotor poles continue to move out of alignment.

Once the increasing current reaches $I_{HI}$ again at $t_6$, the switch 122 opens (or is turned off) while the switch 124 remains open (or off). The configuration returns to FIG. 7B where the current flows through the diodes 126 and 128 to the DC bus 66. The difference (back-EMF voltage–DC bus voltage) is negative causing the current to decrease toward the $I_{LO}$ value, which it reaches at $t_7$.

As can be seen from FIG. 6, the process continues, regulating the phase winding current in the hysteresis band between the $I_{HI}$ and $I_{LO}$ current values. Note that as the rotor and stator poles move away from the aligned position, the time between successive current excursions ($I_{LO}$ to $I_{HI}$ and $I_{HI}$ to $I_{LO}$) decreases. Thus the on or closed interval for the switch 122 and the on interval for the diode 128 continually decrease between $t_4$ and $t_8$.

FIG. 6 also illustrates a commutation trace 140, identifying the time during which the switched reluctance machine 60 is in the generating mode. Note that in the embodiment of FIG. 6, the commutation period begins prior to the point where the rotor and stator windings are aligned and terminates when they reach an unaligned position. The endpoints for the commutation period can be adjusted to optimize the characteristics of the switched reluctance machine 60 in accordance with the intended application. That is, the turn-on angle (the beginning of the commutation period) and the turn-off angle (the end of the commutation period) can be optimized to maximize the efficiency or power in the switched reluctance machine 60. To accomplish this, generally a series of simulations must be run to identify the optimum angles.

Once the current reaches the zero value at $t_8$ of FIG. 6, the switches 122 and 124 are both opened and the diodes 126 and 128 are no longer forward biased and therefore carry no current. The waveforms of FIG. 6 therefore return to their initial condition values at $t_0$. It should also be noted from FIG. 6 that the switch 124 is on or closed only during the initial excitation period ($\Delta t_4$) and the diode 126 is on or forward biased during the regulation period, except for the initial excitation interval. The diode 128 and the switch 122 cycle between forward/reverse biased and between open/closed states during the regulation period (i.e., between $t_4$ and $t_8$).

In the prior art hard-chopping technique both the switches 122 and 124 are either closed or open (i.e., the electronic device implementing the switch is either on or off), as shown in FIGS. 7A and 7B. The present invention adds the free wheeling period illustrated in FIG. 7C. As a result, the switching frequency of the prior art hard-chopping technique is much higher, as the switches open and close each time the current reaches the $I_{LO}$ and $I_{HI}$ values, respectively. With the addition of the freewheeling period of FIG. 7C, the switching frequency is lower because more time elapses between the current excursions between $I_{HI}$ and $I_{LO}$.

Although the switches 122 and 124 are illustrated in FIGS. 7A, 7B and 7C as simple physical switches, in practice, the switches 122 and 124 can be implemented by MOSFET's, bipolar junction transistors, insulated gate bipolar transistors, or any other switching device capable of operating in a high current/power condition. Control over the switches 122 and 124 is exercised by the controller 80 shown in FIG. 5. The controller 80 is responsive to the phase current on the power converter 68 via the feedback line 84A, 84B and 84C for determining when that current reaches either of the threshold values $I_{HI}$ or $I_{LO}$ illustrated in FIG. 6. When a threshold value is reached, the controller 80 controls the appropriate switch 122 and/or 124 as illustrated by the configurations of FIGS. 7A, 7B and 7C.

Figure 8:
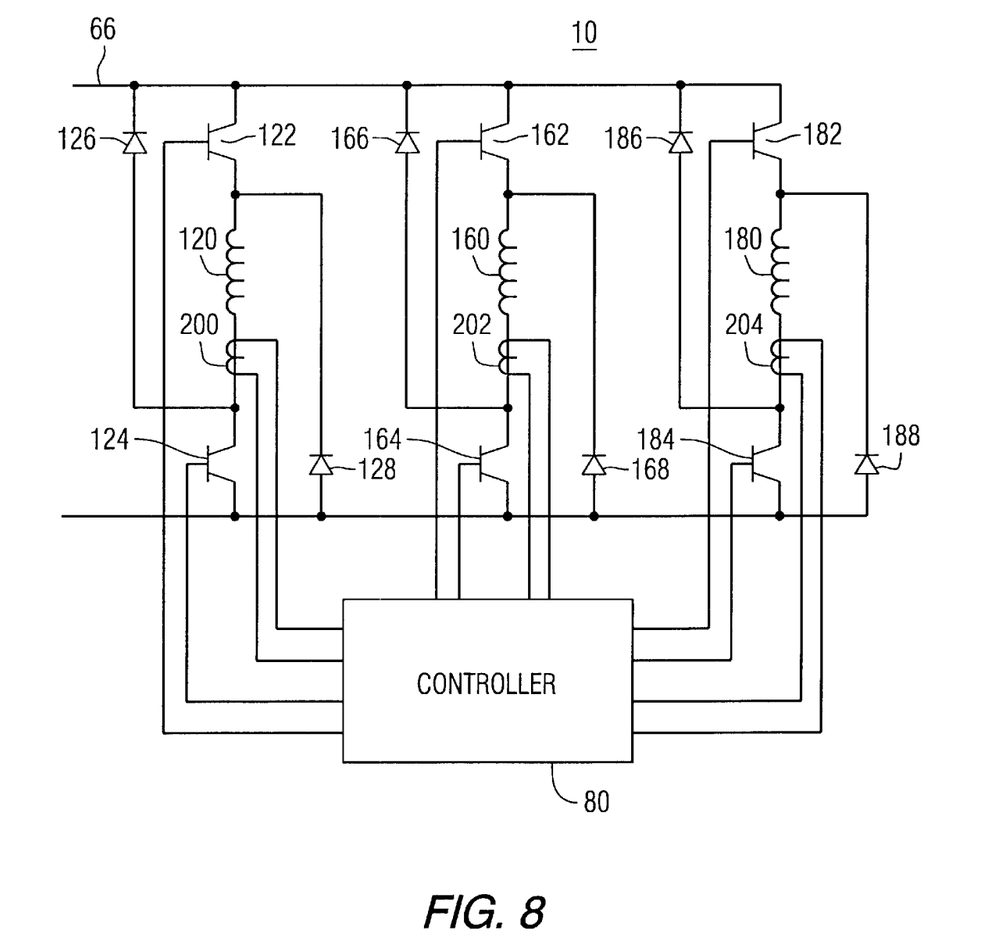
FIG. 8 illustrates the phase windings and control components for a switched reluctance machine.

FIG. 8 is a schematic diagram showing all phase windings and control components for a switched reluctance machine 60. That is, not only the phase winding 120 illustrated in FIGS. 7A, 7B and 7C, but also the two additional phase windings associated with a 6/4 switch reluctance machine and suitable for implementation of the teachings in accordance with the present invention. In addition to the phase winding 120 and the control components (specifically the switches 122 and 124 and the diodes 126 and 128 illustrated in FIGS. 7A, 7B and 7C) the FIG. 8 schematic also illustrates phase windings 160 and 180. Semiconductor switches 162 and 164 are connected in series with the phase winding 160 and semiconductor switches 182 and 184 are connected in series with the phase winding 180. Further, the diodes 166 and 168 (for controlling the current through the phase winding 160) and diodes 186 and 188 (for controlling the current through the phase winding 180) are connected as shown. FIG. 8 also illustrates current sense windings 200, 202 and 204 for sensing the current on the phase windings 120, 160 and 180, respectively, for use by the controller 80 to determine when the current reaches the threshold values $I_{HI}$ and $I_{LO}$, as illustrated in FIG. 6. The controller 80 controls the switches 122, 124, 162, 164, 182 and 184 at a control terminal associated with each of the switches. As discussed above, the switches can be implemented as MOSFET's, bipolar junction transistors, insulated gate bipolar transistors with the control terminal identified in accordance with the standard control mechanism for the selected switch component.

From FIG. 6, it can be observed that the switch 122 is the modulator switch, switching on and off (or closed and open) throughout the regulation interval between $t_4$ and $t_8$. In contrast, the switch 124 is on or closed only during the initial excitation interval ($\Delta t_4$) and is off or open for the remainder of the regulation interval. Further, the diode 126 conducts for the entire regulation period from $t_0$ to $t_8$ except during the interval $\Delta t_4$. Finally, the diode 128 is the modulator diode as it switches on and off throughout the entire interval $t_0$ to $t_8$. The commutation signal in FIG. 6 indicates the interval where the phase winding has to be energized, in the generating state.

Figure 9:
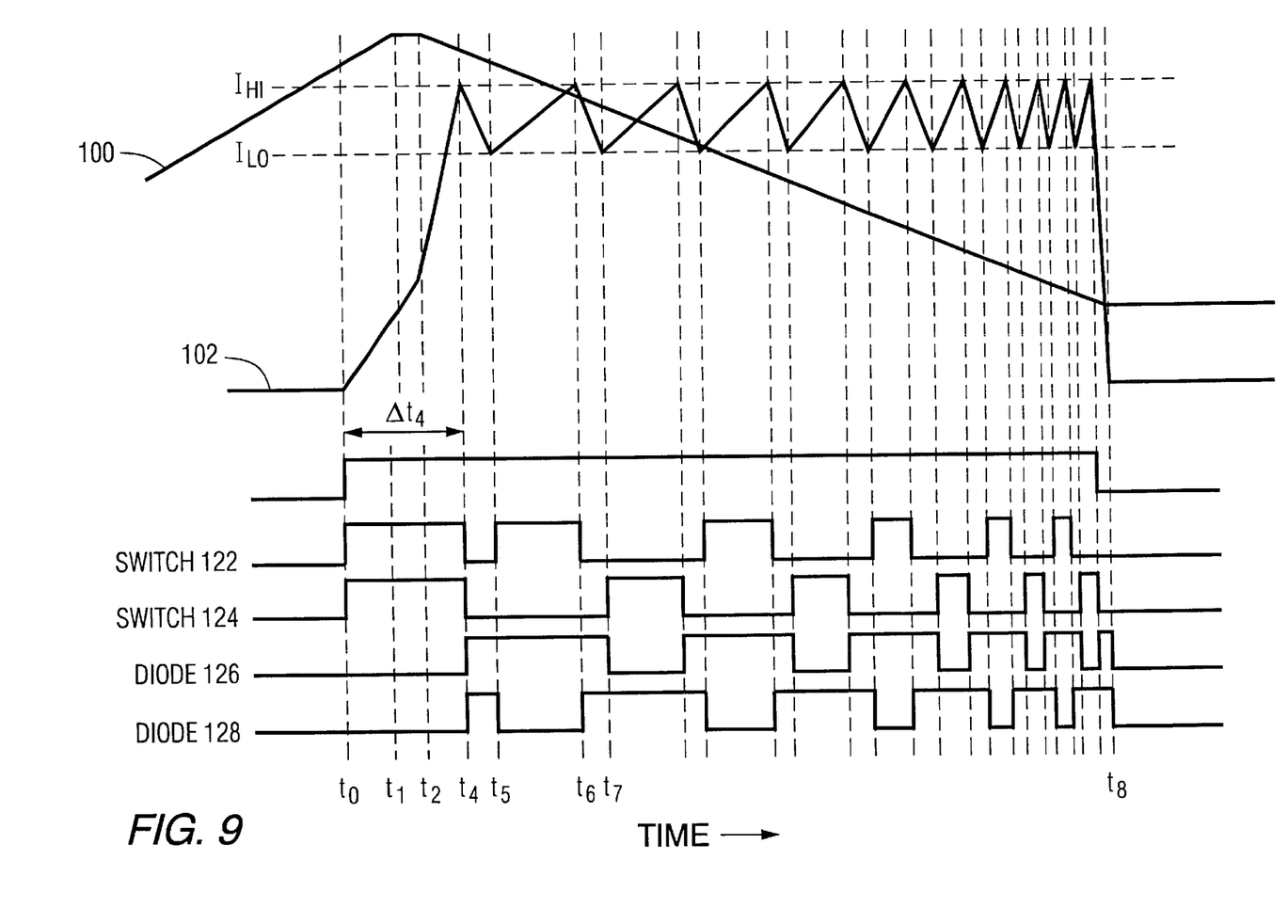
FIG. 9 illustrates timing diagrams for controlling the switched reluctance machine in conjunction with another embodiment of the present invention.

Because the switch 122 is constantly modulating between opened (off) and closed (on) it undergoes more stress than the switch 124. Similarly, the diode 128 undergoes more stress than the diode 126 because it is constantly changing between a reverse biased and a forward biased condition. To balance the stresses among the control components, the modulator switch can be alternated between the switch 122 and the switch 124 during each commutation period or after a predetermined number of commutation periods. That is, the switch 122 acts as a modulator switch for the first commutation period and the switch 124 serves as the modulator switch for the second commutation period; or the switch 122 acts as the modulator switch for a first predetermined number of commutation periods then the switch 124 serves as the modulator switch for a second predetermined number of commutation periods, wherein the first and the second predetermined number of commutation periods are not necessarily equal. In another embodiment, the modulator switch can be alternated based on switching cycles (i.e., the opening and closing of a switch) or electrical cycles (i.e., positive-going and negative-going excursions of an electrical signal associated with operation of the switched reluctance machine). One embodiment of this so-called balanced mode for operating the switches and diodes, by alternating the modulator switch for each switching period, is illustrated in FIG. 9. Comparison with FIG. 6 shows that the current soft chopping feature is still present, however, the switches 122 and 124 are alternately opened and closed as shown in the FIG. 9 timing diagrams. In this way, the stresses are balanced between the switches 122 and 124 and further between the diodes 126 and 128. Balancing the stresses also balances the losses associated with the switches 122 and 124 because the heat generated by each of the switches 122 and 124 is approximately equivalent. Additionally, reducing the heat generated by the switch 122 reduces hot spots within the device and avoids the use of a large heat sink. Finally, highly stressed devices are more likely to fail than those devices operated more conservatively within their operational parameters.

Figure 10:
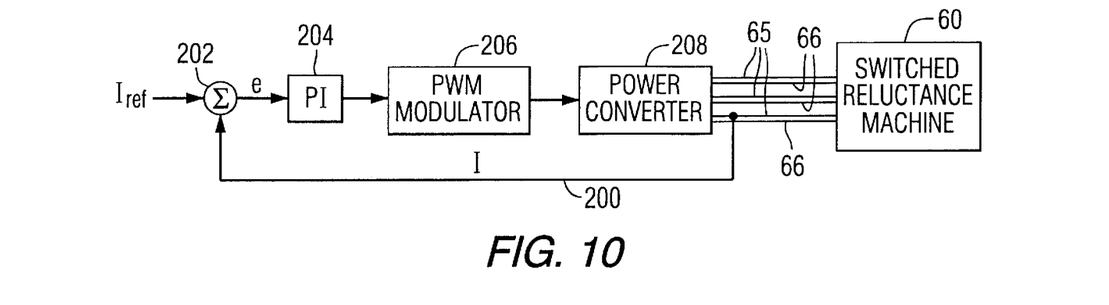
FIG. 10 is a block diagram of components for controlling the switched reluctance machine in accordance with a pulse width modulation technique of the present invention.

The advantages derived from the soft chopping feature of the present invention can also be implemented in a pulse width modulation scheme, as illustrated in FIG. 10. If the switch 124 remains open or off while a pulse width modulated signal is applied to the switch 122, the voltage applied to the phase winding 120 varies from the negative DC bus value to zero, depending upon the duty cycle of the pulse width modulated signal. See FIGS. 7B and 7C. The current generated by the switched reluctance machine 60 is fed back over a feedback line 200 to an adder 202. The adder 202 is also responsive to a reference current, $I_{ref}$. Initially, the phase winding 120 is excited with the full positive DC bus voltage as illustrated in FIG. 7A wherein both the switches 122 and 124 are closed. The current is controlled by the difference between the actual current value (as fed back over the feedback line 200 from the switched reluctance machine 60) and the $I_{ref}$ current value. An error signal is created by the adder 202 and input to a proportional-integral controller 204. The proportional integral controller 204 produces a duty cycle signal representative of the closure time of the switch 122 required to minimize the error signal. The duty cycle signal is input to a pulse width modulation modulator 206, where a pulse width modulated signal having the requisite duty cycle is produced. The pulse width modulated signal is input to a power converter 208 for generating the switch control signals supplied to the switched reluctance machine 60, over the three pairs of phase winding leads 65 and 66. In one embodiment, the power converter 208 comprises the switches 122 and 124 and the diodes 126 and 128, see FIGS. 7A, 7B and 7C, for controlling the switched reluctance machine 60. The feedback loop is closed via the feedback line 200, which carries a signal representative of the current passing through at least one of the phase windings, such as the phase winding 120. In another embodiment, signals representative of the phase winding current in the other phase windings are fed back for generating a pulse width modulated signal for controlling these other phase windings.

While the invention has been described with reference to preferred embodiments, it will be understood by those skilled in the art that various changes may be made and equivalent elements may be substituted for elements thereof without departing from the scope of the invention. The scope of the present invention further includes a combination of the elements from the various embodiments set forth herein. In addition, modifications may be made to adapt a particular situation to the teachings of the present invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for controlling a switched reluctance machine, wherein the switched reluctance machine includes a plurality of rotor and stator poles and a plurality of phase windings on one or more of the stator poles, and wherein the switched reluctance machine is responsive to a voltage bus, said apparatus comprising:

for each phase winding:
- a first switch connected between a first terminal of the voltage bus and a first terminal of the phase winding;
- a second switch connected between a second terminal of the voltage bus and a second terminal of the phase winding;
- a first unidirectional conduction device having a first terminal connected to the first terminal of the voltage bus and a second terminal connected to the second terminal of the phase winding, wherein said first unidirectional conduction device conducts current only in the direction from the second terminal to the first terminal thereof;
- a second unidirectional conduction device having a first terminal connected to the first terminal of the phase winding and a second terminal connected to the second terminal of the voltage bus, wherein said second unidirectional conduction device conducts current only in the direction from the second terminal to the first terminal thereof;
- wherein during at least a portion of the time when the rotor and stator poles are approaching, each of said first and second switches are closed and current flows from the first terminal of the voltage bus through the serial connection of said first switch, the phase winding and said second switch;
- wherein when the phase winding current is at a first predetermined value while the inductance of the rotor and stator poles of the phase winding is decreasing, opening said first and second switches, such that current flows from the second terminal of the voltage bus serially through said second unidirectional conduction device, from the first to the second terminals of the phase winding and through said first unidirectional conduction device to the first terminal of the voltage bus, after which the phase winding current begins to decrease;
- wherein when the phase winding current is at a second predetermined value, closing said first switch such that current flows through a short circuit loop comprising said first switch, the phase winding and said first unidirectional conduction device, after which the phase winding current begins to increase;
- wherein when the phase winding current is at the first predetermined value, opening said first switch such that the current flows from the second terminal of the voltage bus serially through said second unidirectional conduction device, from the first to the second terminals of the phase winding and through said first unidirectional conduction device to the first terminal of the voltage bus, after which the phase winding current begins to decrease;
- wherein the phase winding current changes between the first and second predetermined values until the inductance between the rotor and stator poles reaches a minimum value.

2. The apparatus of claim 1 wherein the first and the second switches are selected from a group comprising a metal-oxide semiconductor field-effect transistor, a bipolar junction transistor and an insulated gate bipolar transistor.

3. The apparatus of claim 1 wherein the first and the second unidirectional conduction devices comprise a first and a second pn junction diode, wherein the first terminal of said first and said second pn junction diodes is the cathode terminal, and wherein the second terminal of said first and said second pn junction diodes is the anode terminal.

4. The apparatus of claim 1 wherein the first and the second switches remain in the closed configuration when the switched reluctance machine is operating below the base speed.

5. The apparatus of claim 1 wherein the voltage bus is a DC voltage bus and wherein the first and the second terminals of the voltage bus are the positive polarity and negative polarity terminals, respectively.

6. The apparatus of claim 1 wherein during a first rotational cycle of the switched reluctance machine one of the first or the second switches is closed to form the short circuit loop and during a second rotational cycle of the switched reluctance machine the other one of the first and the second switches is closed to form the short circuit loop.

7. The apparatus of claim 6 wherein a cycle of the switched reluctance machine is selected from among a commutation cycle, a rotation cycle or an electrical cycle.

8. The apparatus of claim 1 further comprising a capacitor connected between the first and the second terminals of the voltage bus.

9. The apparatus of claim 1 wherein a pulse width modulated signal controls the state of the first switch when the second switch is open, and wherein the pulse width modulated signal is derived from the phase winding current.

10. The apparatus of claim 9 further comprising:
- a reference current;
- a summer responsive to the phase winding current and said reference current, for producing an error signal;
- a proportional-integrator controller responsive to said error signal for producing a duty cycle signal; and
- a pulse-width modulator responsive to said duty cycle signal for producing the pulse-width modulated signal.

11. The apparatus of claim 1 wherein the first and the second switches are operatively controlled only when the switched reluctance machine is in the generating mode.

12. An apparatus for controlling a switched reluctance machine, wherein the switched reluctance machine includes a plurality of rotor and stator poles and a plurality of phase windings on one or more of the stator poles, and wherein the switched reluctance machine is responsive to a voltage bus, said apparatus comprising:
for each phase winding:
- a first switch connected between a first terminal of the voltage bus and a first terminal of the phase winding;
- a second switch connected between a second terminal of the voltage bus and a second terminal of the phase winding;
- a first unidirectional conduction device having a first terminal connected to the first terminal of the voltage bus and a second terminal connected to the second terminal of the phase winding, wherein said first unidirectional conduction device conducts current only in the direction from the first to the second terminal thereof;
- a second unidirectional conduction device having a first terminal connected to the first terminal of the phase winding and a second terminal connected to the second terminal of the voltage bus, wherein said second unidirectional conduction device conducts current only in the direction from the first terminal to the second terminal thereof;
- wherein during at least a portion of the time when the rotor and stator poles are approaching, each of said first and second switches are closed and current flows from the second terminal of the voltage bus through the serial connection of said second switch, the phase winding and said first switch;
- wherein when the phase winding current is at a first predetermined value while the inductance of the rotor and stator poles of the phase winding is decreasing, opening said first and second switches, such that current flows from the first terminal of the voltage bus serially through said first unidirectional conduction device, from the second to the first terminals of the phase winding and through said second unidirectional conduction device to the second terminal of the voltage bus, after which the phase winding current begins to decrease;

wherein when the phase winding current is at a second predetermined value, closing said first switch such that current flows through a short circuit loop comprising said first switch, the phase winding and said first unidirectional conduction device, after which the phase winding current begins to increase;

wherein when the phase winding current is at the first predetermined value, opening said first switch such that the current flows from the first terminal of the voltage bus serially through said first unidirectional conduction device, from the second to the first terminals of the phase winding and through said second unidirectional conduction device to the second terminal of the voltage bus, after which the phase winding current begins to decrease;

wherein the phase winding current changes between the first and second predetermined values until the inductance between the rotor and stator poles reaches a minimum value.

13. The apparatus of claim 12 wherein the first and the second switches are selected from a group comprising a metal-oxide semiconductor field-effect transistor, a bipolar junction transistor and an insulated gate bipolar transistor.

14. The apparatus of claim 12 wherein the first and the second unidirectional conduction devices comprise a first and a second pn junction diode, wherein the first terminal of said first and said second pn junction diodes is the anode terminal, and wherein the second terminal of said first and said second pn junction diodes is the cathode terminal.

15. The apparatus of claim 12 wherein the first and the second switches remain in the closed configuration when the switched reluctance machine is operating below the base speed.

16. The apparatus of claim 12 wherein the voltage bus is a DC voltage bus and wherein the first and the second terminals of the voltage bus are the negative polarity and the positive polarity terminals, respectively.

17. The apparatus of claim 12 wherein during one or more cycles of the switched reluctance machine one of the first or the second switches is closed to form the short circuit loop and during subsequent one or more cycles of the switched reluctance machine the other one of the first and the second switches is closed to form the short circuit loop.

18. The apparatus of claim 17 wherein a cycle of the switched reluctance machine includes a commutation cycle, a rotation cycle or an electrical cycle.

19. The apparatus of claim 12 further comprising a capacitor connected between the first and the second terminals of the voltage bus.

20. The apparatus of claim 12 wherein a pulse width modulated signal controls the state of the first switch when the second switch is open, and wherein the pulse width modulated signal is derived from the phase winding current.

21. The apparatus of claim 12 further comprising:

a reference current;

a summer responsive to the phase winding current and said reference current, for producing an error signal;

a proportional-integrator controller responsive to said error signal for producing a duty cycle signal; and a pulse-width modulator responsive to said duty cycle signal for producing the pulse-width modulated signal.

22. The apparatus of claim 12 wherein the first and the second switches are operatively controlled only when the switched reluctance machine is in the generating mode.

23. An apparatus for controlling the phase winding current of a switched reluctance machine, wherein the switched reluctance machine includes a plurality of rotor and stator poles and a plurality of phase windings on one or more of the stator poles, said apparatus comprising:

a power converter connected to a bus, wherein the power converter supplies current to the plurality of phase windings from the bus;

wherein the power converter reverses the voltage applied to each one of the plurality of phase windings when the current through the phase winding reaches a first predetermined value while the inductance between the rotor and stator poles of the phase winding is decreasing; and wherein said power converter shorts each one of the plurality of phase windings when the current through the phase winding reaches a second predetermined value while the inductance between the rotor and stator poles of the phase winding is decreasing.

24. The apparatus of claim 23 wherein the first predetermined current value is greater than the second predetermined current value.

25. The apparatus of claim 23 wherein when the power converter reverses the voltage applied to the phase winding, the phase winding current decreases.

26. The apparatus of claim 23 wherein when the power converter shorts the phase winding, the phase winding current increases.

27. The apparatus of claim 23 wherein the power converter is operative during the commutation interval for each phase winding.

28. The apparatus of claim 24 wherein the power converter is operative when the switched reluctance machine is operating below the base speed.

29. The apparatus of claim 23 wherein the power converter is operative when the back-EMF of a phase winding is positive.

30. The apparatus of claim 23 wherein controlling the phase winding current of the switched reluctance machine decreases the current ripple.

31. The apparatus of claim 23 wherein controlling the phase winding current of the switched reluctance machine increases the efficiency of the switched reluctance machine.

32. The apparatus of claim 23 wherein the power controller is operative during the generating mode of the switched reluctance machine.

* * * * *